United States Patent
Ash

(10) Patent No.: US 11,230,662 B2
(45) Date of Patent: Jan. 25, 2022

(54) THIOL-ENE FORMULATION FOR ELECTROCHROMIC DEVICES, DEVICE COMPONENTS AND RELATED METHODS

(71) Applicant: GENTEX Corporation, Zeeland, MI (US)

(72) Inventor: Kevin L. Ash, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 198 days.

(21) Appl. No.: 16/161,033

(22) Filed: Oct. 15, 2018

(65) Prior Publication Data
US 2020/0115628 A1    Apr. 16, 2020

(51) Int. Cl.
| | | |
|---|---|---|
| C09K 9/00 | (2006.01) | |
| C08G 75/045 | (2016.01) | |
| E06B 9/24 | (2006.01) | |
| E06B 3/67 | (2006.01) | |
| G02F 1/1503 | (2019.01) | |
| G02F 1/1516 | (2019.01) | |

(52) U.S. Cl.
CPC .............. *C09K 9/00* (2013.01); *C08G 75/045* (2013.01); *E06B 3/6722* (2013.01); *E06B 9/24* (2013.01); *G02F 1/1503* (2019.01); *E06B 2009/2464* (2013.01); *G02F 1/15165* (2019.01)

(58) Field of Classification Search
CPC ..... C09K 9/00; G02F 1/1503; G02F 1/15165; G02F 1/15; C08G 75/045; E06B 9/24; E06B 3/6722; E06B 2009/2464

USPC .......................................................... 359/275
See application file for complete search history.

(56) References Cited

U.S. PATENT DOCUMENTS

| | | | | |
|---|---|---|---|---|
| 6,002,511 A | * | 12/1999 | Varaprasad | C09K 9/02 359/265 |
| 2015/0349310 A1 | * | 12/2015 | Viner | H01M 4/13 429/126 |
| 2016/0145392 A1 | * | 5/2016 | Toda | C08G 75/045 522/42 |
| 2018/0039148 A1 | | 2/2018 | Franz et al. | |

FOREIGN PATENT DOCUMENTS

RU      2642558 C1     1/2018

OTHER PUBLICATIONS

International Search Report dated Jun. 27, 2019, for correspondence PCT application No. PCT/US2018/055965, 3 pages.
Written Opinion dated Jun. 27, 2019, for corresponding PCT application No. PCT/US2018/055965, 4 pages.

* cited by examiner

*Primary Examiner* — Mohammed A Hasan
(74) *Attorney, Agent, or Firm* — Price Heneveld LLP; Brian James Brewer

(57) ABSTRACT

The disclosed subject matter relates to electrochromic devices including variable electrochromic light filter devices that may be configured to vary the transmissivity of light therethrough in response to an applied voltage from one or more control circuits, device components, electroactive photocurable compositions, cured electroactive polymer compositions used therein and methods of forming the aforementioned devices and electroactive polymer compositions.

18 Claims, 2 Drawing Sheets

THIOL-ENE FORMULATION FOR ELECTROCHROMIC DEVICES, DEVICE COMPONENTS AND RELATED METHODS

FIELD

This disclosure relates to devices and processes related to electrochromic devices.

BACKGROUND

Variable transmission light filters, such as electrochromic light filters including variable electrochromic windows have become commercially available for use in, for example, architectural windows and skylights as well as aircraft and automobile window systems and other light transmissive portals (including automobile windows and sunroofs). Although such variable transmission electrochromic window systems and other light filters have become increasingly popular, solution fill chemistries for forming gels in situ remain problematic, particularly with large area electrochromic devices.

Such in-situ gel formation can require catalysts or photoinitiators or condensation reactions (such as urethane formation) to effect gel formation. Use of such catalysts or photo-initiators along with the chromophore compounds that bring about the electrochromic effect in such devices can bring about deleterious results. For example, the chromophores themselves (for example, N,N' -dihydro-N,N' -dialkyl phenazines) may either interfere with or quench the chemical formation of the gel film, or the chromophores themselves may be degraded by the catalysts or photoinitiators. Also, in some applications it may be preferable to deposit a film containing chromophores that can be gelled on substrates prior to assembling those substrates as an electrochromic device. In such an approach, the film can be deposited on to the substrate by various methods (spraying, drawdown, slot die, etc.), and then cured for example via irradiation or thermal processing. When utilizing non-planar or curved substrates, however, it would be preferable that the film be cured quickly in place (such as by irradiation) to prevent the applied gel system from pooling, forming an uneven distribution of the film and/or chromophores, which can more readily occur in cure processes that require longer amounts of time (such as via thermal curing). It is also desirable to have a device that exhibits memory and has a consistent cell spacing to effectively control the amount of light transmission or darkness that can be achieved. The latter can be difficult to control, particularly where such devices include curved fixtures or complex bends.

SUMMARY

In one embodiment, an electroactive photocurable polymer composition is provided. The electrochromic photocurable polymer composition includes an ene compound, a thiol compound and an electroactive composition.

In another embodiment, an electrochromic device is provided. The electrochromic device includes a first substrate, a second substrate and an ion transport layer. The first substrate includes a first electrically conductive material associated therewith and a cured electroactive photocurable polymer composition applied to and in contact with a first conductive material, wherein the photocurable polymer composition includes an ene compound, a thiol compound and an electroactive composition. The second substrate includes an electrically conductive material associated therewith and an electroactive polymer composition applied to and in contact with the second conductive material. The ion transport layer is positioned between the first and second electroactive polymer composition and wherein the electroactive composition of the cured electroactive photocurable polymer composition is either an anodic material or a cathodic material and the electroactive composition of the second electroactive polymer composition is the other of the anodic material or the cathodic material, at least one of the first substrate and the second substrate is substantially transparent and at least one of the anodic material and cathodic material is electrochromic.

In another embodiment, a method forming a cured electroactive photocurable composition is provided. The method includes providing an electroactive photocurable composition including an ene compound and a thiol compound; and curing the electroactive photocurable composition using radiation in the UV electromagnetic spectrum to form a cured electroactive polymer composition including the electroactive composition disposed in a matrix that includes a thiol-ene polymer.

BRIEF DESCRIPTION OF THE DRAWINGS

Certain embodiments of the present disclosure are illustrated by the accompanying figures. It will be understood that the figures are not to scale and that details not necessary for an understanding of the disclosure or that render other details difficult to perceive have been omitted for clarity. It will be further understood that the disclosure is not necessarily limited to the particular embodiments illustrated herein. These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
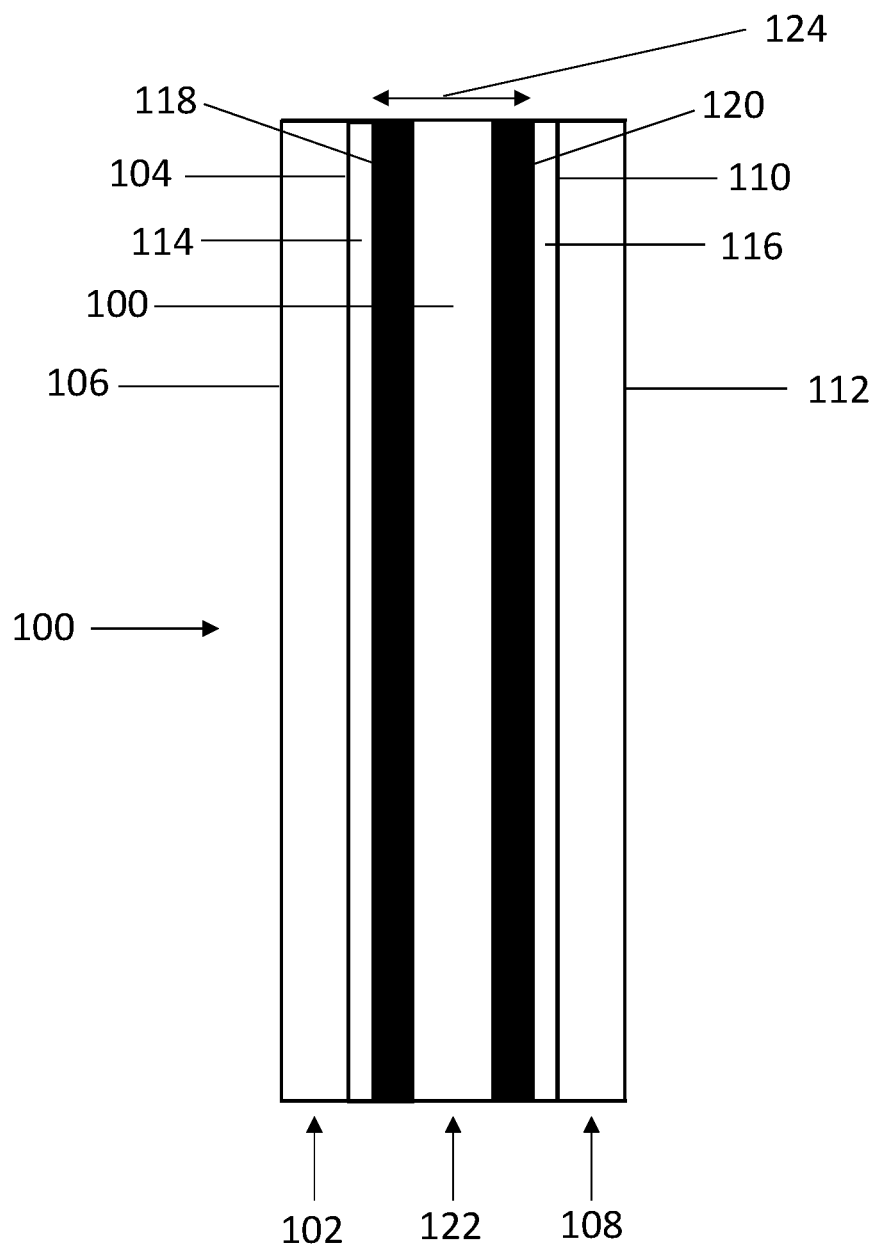
FIG. 1 is a schematic illustration of a cross section of an electrochromic device.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by the present disclosure. As used herein, "about" may be understood by persons of ordinary skill in the art and can vary to some extent depending upon the context in which it is used. If there are uses of the term which are not clear to persons of ordinary skill in the art, given the context in which it is used, "about" may mean up to plus or minus 10% of the particular term.

"Electrochromic device" should be understood to be devices that vary the transmissivity of light therethrough in response to an applied voltage from one or more control circuits and include chromophores that vary the light transmission in response to the applied voltage. Such chromophores may include, for example at least one anodic material, or at least one cathodic material that can be electroactive and electrochromic.

For electrochromic devices, such as those embodiments included herein, particularly larger area electrochromic devices, such as, for example windows, sun roofs, etc., it would be advantageous to be able to quickly deposit an electrochromic material and quickly form a film in place on a substrate or alternately to form a film and then transfer it to a substrate. In general, this can be accomplished, for example, by techniques such as spray deposition or slot die, etc. However, when imparting electrochromic functionality to such films using catalysts or photoinitiators, there may be detrimental interactions between the chromophores and the catalysts or photoinitiators, as explained above.

Thiol-ene reactions, as shown in general in the reaction below, in which a thiol compound and an ene compound (including at least one carbon-carbon double bond, i.e. —C═C—) react, are UV cross-linkable polymer systems that can be formed, including polymerization that are catalyst and/or photo-initiator free.

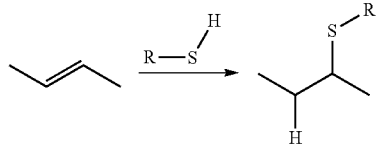

By employing such chemistry capable of forming matrix or gel systems, it is possible to form matrix or gel films containing chromophores via UV irradiation, including polymerization without employing catalysts or photoinitiators. Such systems can be quick to respond to UV radiation (particularly in the about 254 nanometers (nm) wavelength,) and produce excellent films. The resulting films can avoid the additional shortcomings of typical UV formulations in that they are not as inclined to produce yellowing in the final film and are not significantly oxygen inhibited during the curing process.

In general, the thiol-ene reaction can encompass a wide spectrum of materials. The thiol-ene system can incorporate ene compounds such as, e.g., acrylates, methacrylates, vinylenes, vinyl ethers, other enes, and etc. Resulting viscosities of such thiol and ene systems prior to curing allows systems to be spray-or slot die coated and cured under UV radiation on either final substrates (such as ITO-coated glass) or can be applied and formed on other substrates and transferred later to the final substrate. Additionally, since these systems can be spray or slot die coated and then quickly UV cured, they can be amenable to geometrically varied surfaces, such as cylindrically, spherically, or irregularly bent substrates.

Aspects of the present disclosure include electrochromic devices including variable electrochromic light filter devices that may be configured to vary the transmissivity of light therethrough in response to an applied voltage from one or more control circuits, electroactive photocurable compositions that may also be electrochromic, cured electroactive polymer compositions that may also be electrochromic, used therein and methods of forming the aforementioned devices and electroactive polymer compositions that may also be electrochromic. An electrochromic device can include for example, architectural windows and skylights as well as aircraft and automobile window systems and other light transmissive portals.

Other aspects of the present disclosure include an electroactive photocurable composition including an ene compound, a thiol compound and an electroactive composition, the reaction product of which upon photocuring includes the electroactive composition disposed in a matrix that includes a thiol-ene polymer where the electroactive composition may also be electrochromic.

Other aspects of the present disclosure include an electrochromic device that includes two substrates, where at least one substrate is substantially transparent. The electrochromic device also includes substrates having an electrically conductive material associated with each substrate and a layer of an electroactive material or coating, where at least one electroactive material or coating is an electroactive composition disposed in a matrix that includes a thiol-ene polymer, arranged such that the electroactive layers face each other with an ion transport layer therebetween, where at least one of the electroactive compositions is also electrochromic.

Other aspects of the present disclosure include a component of an electrochromic device that may include a substrate that is substantially transparent having an electrically conductive material associated therewith, the substrate also including an electroactive photocurable composition including an ene compound, a thiol compound and is an electroactive composition where the electroactive composition may also be electrochromic.

Other aspects of the present disclosure include a component of an electrochromic device that may include a substrate that is substantially transparent having an electrically conductive material associated, the substrate also including a layer of a cured electroactive photocurable composition including an electroactive composition disposed in a matrix that includes a thiol-ene polymer where the electroactive composition may also be electrochromic.

Other aspects of the present disclosure include a method of forming a cured electroactive photocurable composition including an ene compound, a thiol compound and an electroactive composition, the method may include curing an electroactive photocurable composition including an alkene, a thiol and an electroactive composition using radiation in the UV electromagnetic spectrum to form a cured electroactive polymer composition including an electroactive composition disposed in a matrix that includes a thiol-ene polymer where the electroactive composition may also be electrochromic.

Other aspects of the present disclosure include a method of forming an electrochromic device may include applying an electroactive photocurable composition including an ene compound, a thiol compound and an electroactive composition to a substrate and curing the electroactive photocurable composition using radiation in the UV electromagnetic spectrum to form a cured electroactive polymer composition including an electroactive composition disposed in a matrix that includes a thiol-ene polymer where the electroactive composition may also be electrochromic.

As illustrated in FIG. 1, one embodiment of an electrochromic device 100 can generally include first substrate 102 having an inner surface 104 and an outer surface 106 and a second substrate 108 having an inner surface 110 and an outer surface 112. A first electrically conductive material 114 can be associated with first substrate 102, for example, coated onto inner surface 104, and a second electrically conductive material 116 can be associated with second substrate 108, for example, coated onto inner surface 110. A first cured electroactive photocurable composition 118, the first electroactive photocurable composition including an ene compound, a thiol compound and an electroactive composition including an anodic or cathodic material, can be associated with the first electrically conductive material 114. A second cured electroactive photocurable composition 120, the second electroactive photocurable composition including an ene compound, a thiol compound and an electroactive composition including the other of an anodic or cathodic material, can be associated with the second electrically conductive material 116. At least one of the electroactive composition of the first electroactive photocurable composition and the electroactive composition of the first electroactive photocurable composition is also electrochromic. An ion transport layer 122 can be positioned between the first cured electroactive photocurable composition 118 and the second cured electroactive photocurable composition 120. Width 124 including the first cured electroactive photocurable composition 118 and second cured electroactive photocurable composition 120 with the ion transport layer 122 therebetween, can be substantially consistent and can range from about 50 microns to about 1000 microns or about 250 microns to about 500 microns. Should the embodiment of FIG. 1 be incorporated into, for example, a window or sunroof, either outer surface 106 or outer surface 112 can face the external environment and the other of the two can face the internal environment of where electrochromic device is housed or positioned in, for example, a building or vehicle.

Embodiments of the present disclosure illustrated in FIG. 1 include at least one of layers 118 and 120 that are cured using the UV electromagnetic spectrum embodiments of the present disclosure in the range of about 190 to about 400 nm or less than about 340 nm, including photocuring may also include applying to the electroactive photocurable composition UVC radiation in the range of about 220 to about 290 nm or about 254 nm. With embodiments of the present disclosure where one of layers 118 and 120 are cured using the above UV photocuring, the other of layers 118 and 120, can be cured by other methods including, for example, using catalysts or photoinitiators.

Embodiments included in the present disclosure, particularly bent or curved electrochromic versions of the embodiments herein, can provide advantages when compared to, for example, similar devices in which electroactive compositions that may also be electrochromic are incorporated into moveable or flowable vehicles. For example, embodiments can include maintaining a relatively constant distance (for example, width 124 in FIG. 1) and minimizing migration of electroactive compositions that may also be electrochromic in a polymer matrix, both of which can result in improved and more consistent device performance. Such improved performance can include better "memory" or low maintenance current in which the electrochromic device maintains a substantially consistent color and/or transmissivity in an un-powered state. One example could be in automotive sunroofs where it may be desirable to have a sunroof darkened, reducing the "greenhouse heating" of the cabin (vehicle interior) while the vehicle is parked and not being operated. In such a situation the vehicle is not running, so powering an electrochromic device could be a drain on the vehicle's battery.

Substrates may be fabricated from any one of a number of materials that are transparent or substantially transparent in the visible region of the electromagnetic spectrum, such as, e.g., borosilicate glass, soda lime glass, natural and synthetic polymeric resins, plastics, and/or composites including polyesters (e.g. PET), polyimides (PI), polycarbonates, polysulfones, polyethylene naphthalate (PEN), ethylene vinyl acetate (EVA), acrylate polymers, as well as Topas®, which is commercially available from Ticona of Summit, N.J. The thickness of each substrate will depend largely upon the particular application of the variable electrochromic light filter device. The substrates can be fabricated from a sheet of glass having a thickness ranging from about 0.10 millimeters (mm) to approximately 12.7 mm, approximately 0.50 mm to approximately 1.50 mm, or approximately 0.65 mm to approximately 1.00 mm. If the substrates are fabricated from sheets of glass, the glass can be optionally tempered, heat strengthened, chemically strengthened, and/or laminated prior to or subsequent to other process steps, such as, e.g., being coated with layers of electrically conductive material.

While particular substrate materials may be part of the present disclosure, for illustrative purposes only, it should be understood that numerous other substrate materials are likewise contemplated for use—so long as the materials are at least substantially transparent and exhibit appropriate physical properties, such as strength, to be able to operate effectively in conditions of intended use. Indeed, variable transmission electrochromic windows in accordance with the present disclosure can be, during normal operation, exposed to extreme temperature variation as well as substantial UV radiation, emanating primarily from the sun. It will be further understood that the substrates can include a UV absorbing layer and/or contain a UV absorbing material to help protect the substrate(s) and/or the electrochromic media from UV damage.

Electrically conductive materials associated with each substrate can be the same or different. The electrically conductive material, for illustrative purposes, can include one or more layers of such material intended to act as an electrode for the variable transmission electrochromic window. Electrically conductive material is desirably a material that: (a) is substantially transparent in the visible region of the electromagnetic spectrum; (b) bonds reasonably well to first substrate; (c) maintains this bond when associated with a sealing member; (d) is generally resistant to corrosion from materials contained within the variable transmission electrochromic window or the atmosphere; and (e) exhibits minimal diffuse or specular reflectance as well as sufficient electrical conductance. Illustrative examples of such electrically conductive material may include those fabricated from fluorine doped tin oxide (FTO), such as e.g., TEC glass, which is commercially available from Libbey Owens-Ford-Co., of Toledo, Ohio, indium/tin oxide (ITO), doped zinc oxide, indium zinc oxide, metal oxide/metal/metal oxide (wherein metal oxide can be substituted with metal carbide, metal nitride, metal sulfide, etcetera), or other materials known to those having ordinary skill in the art. Alternatively, one or more metals or alloys can be deposited in a pattern to create a grid or nano-structured electrode on the substrate.

Aspects of a polymer material may include the reaction product of polymerizable monomers of an ene compound and a thiol compound to form a thiol-ene polymer matrix in which an electroactive composition that may also be electrochromic is dissolved or dispersed. Due to the competing reactions of chain growth homopolymerization and thiol/vinyl chain transfer propagation, certain stoichiometric ratios may be utilized to give optimum thiol-ene conversion of thiol and alkene monomers, such as, e.g., the following ratios: 1:4 thiol to acrylate; 3:7 thiol to vinylbenzene; and between 1:5 and 1:8 thiol to methacrylate.

Thiol compounds of the present disclosure can include a single thiol moiety, a multi-functional thiol compounds including two or more thiol moieties or a multi-functional (such as, e.g., di, tri, tetra, etc.) thiol compounds including at least three thiol moieties. Illustrative examples of thiol compounds of the present disclosure include, but are not limited to, trimercaptopropanoates including 1,6-hexanekis (3-merc atoproprionate); trans-1,4-cyclohexanedimethyl bis (3-mercaptoproprionate; 4,4'-isopropylidenedicyclohexane bis(3-mercaptoproprionate); and Trimethylolpropane Tris(3-mercaptopropionate).

An ene compound of the present disclosure can include a reactant having a polymerizable carbon-carbon double bond (i.e., a vinyl group or moiety), a multi-functional ene including two or more polymerizable carbon-carbon double bonds or a multi-functional ene including at least three polymerizable carbon-carbon double bonds. Illustrative examples of enes of the present disclosure include, but are not limited to, acrylates, methacrylates and styrenes, (such as, e.g., difunctional acrylates such as 1,6-hexanediol diacrylate, difunctional methacrylates (such as, e.g., 1,6-hexanediol dimethacrylate and trifunctional vinyls such as triallyl isocyanurate.

An electroactive composition can include at least one anodic material (e.g., some embodiments may include 1, 2, 3 or more anodic materials), or at least one cathodic material (e.g., some embodiments may include 1, 2, 3 or more cathodic materials) such that one substrate includes one of the at least one anodic material or at least one cathodic material as its electroactive composition and the other substrate includes the other of the two as its electroactive composition. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

In addition, an electroactive composition that may also be electrochromic may comprise other materials, such as light absorbers, light stabilizers, thermal stabilizers, antioxidants, thickeners, viscosity modifiers, tint providing agents, redox buffers, solvents, flow modifiers, plasticizers, adhesion promoters, reactive diluents, and mixtures thereof.

For illustrative purposes of the present disclosure, anodic materials may include any one of a number of materials including, for example, ferrocene, substituted ferrocenes, substituted ferrocenyl salts, phenazine, substituted phenazines, triphenodithiozine, substituted thiphenodithiozines, phenothiazine, substituted phenothiazines including substituted dithiazines, thianthrene, and substituted thianthrenes. Examples of anodic materials may include di-tert-butyldiethylferrocene, 5,10-dimethyl-5,10-dihydrophenazine (DMP), 3,7,10-trimethylphenothiazine, 2,3,7,8-tetramethoxy-thianthrene, 10-methylphenothiazine, tetramethylphenazine (TMP)—see U.S. Pat. No. 6,242,602 B1 for synthesis, which is hereby incorporated herein by reference in its entirety, and bis(butyltriethylammonium)-para-methoxytriphenodithiazine (TPDT)—see synthesis of 3,10-dimethoxy-7,14-(triethylammoniumbutyl)-triphenodithazinebis (tetrafluoroborate) in U.S. Pat. No. 6,710,906 B2, which is hereby incorporated herein by reference in its entirety.

For illustrative purposes of the present disclosure, cathodic materials may include, for example, viologens and substituted viologens, such as bis allyl viologen tetrafluoroborate, divinylviologen hexafluoroborate, methyl viologen tetrafluoroborate, octyl viologen tetrafluoroborate (octylviologen), or benzyl viologen tetrafluoroborate, ferrocinium salts, such as (6-(tri-tert-butylferrocinium) hexyl)triethyl-ammonium di-tetrafluoroborate (TTBFc$^+$)—see U.S. Pat. No. 7,046,418 entitled "Reversible Electrodeposition Devices And Associated Electrochemical Media" for synthesis which is hereby incorporated herein by reference in its entirety. It will be understood that the preparation and/or commercial availability for each of the above-identified cathodic materials is well known in the art. See, for example, "The Bipyridinium Herbicides" by L. A. Summers (Academic Press 1980).

While specific anodic materials and cathodic materials have been provided for illustrative purposes only, numerous other conventional cathodic materials are likewise contemplated for use including, but by no means limited to, those disclosed in previously referenced U.S. Pat. Nos. 4,902,108, 6,188,505, 6,710,906 B2, as well as U.S. Pat. No. 7,855,821 B2 entitled "Electrochromic Compounds and Associated Media and Devices," all of which are hereby incorporated herein by reference in their entirety including all references incorporated and/or cited therein. Moreover, it is contemplated that the cathodic material may comprise a polymer film, such as various substituted polythiophenes, polymeric viologens, an inorganic film, or a solid transition metal oxide, including, but not limited to, tungsten oxide.

Anodic materials and cathodic materials may include at least one of a polymerizable ene functional group or a polymerizable thiol functional group such that upon polymerization of the ene compound and thiol compound, the anodic material or cathodic material included in the polymer layer can become incorporated into the thiol-ene polymer matrix or the thiol-ene polymer backbone of the cured polymer. An embodiment of the present disclosure can include a photocurable coating composition according to another embodiment of the present disclosure that includes the anodic material or the cathode material as a monomer included in the cured polymer matrix. Illustrative examples of such compounds can include diallyl viologen (also known as 1,1' -diallyl-4,4' -bipyridiniumbis(hexafluorophosphate)

which is a cathodic electrochromic and 5,10-diallylphenazine which is an anodic electrochromic.

For illustrative purposes only, the concentration of the anodic and/or cathodic materials can range from about 5 weight % to about 75 weight % on the resin formula or about 25 weight % to about 50 weight % on the resin formula.

The electroactive photocurable polymer composition may include an ene compound ranging from about 5 weight % to about 75 weight %, a thiol compound ranging from about 5 weight % to about 75 weight % and an electroactive composition that may also be electrochromic ranging from about 5 weight % to about 75 weight %. In some embodiments, an ene compound ranges from about 25 weight % to about 50 weight %, a thiol compound ranges from about 25 weight % to about 50 weight % and an electroactive composition that may also be electrochromic ranges from about 25 weight % to about 50 weight %.

The selection and amounts of the ene, thiol and electroactive composition in the electroactive photocurable polymer composition should result in minimizing the effect the ene, the thiol and the resulting polymer have on the function of the electroactive composition that may also be electrochromic. Such selection should also result in acceptable adhesion of the electroactive photocurable polymer composition or cured version thereof to a substrate and minimizing the effect the electroactive composition that may also be electrochromic has on the photocuring of the ene and thiol.

For illustrative purposes of the present disclosure, an ion transport layer may function as supporting layer during the electrochromic oxidation-reduction reaction occurring between the cathodic and anodic materials associated with the first cured electroactive photocurable composition 118 and the second cured electroactive photocurable composition 120. As such the ion transport layer provides electrical connectivity across the device and includes materials capable thereof. For illustrative purposes of the present disclosure, the ion transport layer may include any one of a number of materials or combinations thereof including, for example, lithium tetrafluoroborate; lithium triflate; lithium triflamide; lithium hexafluorophosphate; tetramethylammonium tetrafluoroboate; tetramethylammonium triflate; tetramethylammonium triflamide; tetramethyl ammonium hexafluorophosphate; tetraethylammonium tetrafluoroborate; tetraethylammonium triflate; tetraethylammonium triflamide; tetraethylammonium hexafluorophosphate; ammonium hexafluorophosphate; triphenylphosphonium tetrafluoroborate; triphenylphosphonium triflate; triphenylphosphonium triflamide; triphenylphosphonium hexafluorophosphate. The selection and amount of the ion transport material in the ion transport layer should minimize detrimental effects on the cured electrochromic photocurable composition embodiments, including, for example, structural breakdown of the cured composition or components thereof. The ion transport layer can be disposed in a matrix, a polymer matrix or a polymer matrix consisting of crosslinked acrylic backbone polymer, such as 1:10 HEMA/MA crosslinked with a diisocyanate.

Embodiments of the present disclosure can also include photocuring an embodiment of an electroactive photocurable composition including an ene compound, a thiol compound and an electroactive composition that may also be electrochromic. For illustrative purposes, such photocuring can include subjecting or applying to the electroactive photocurable composition radiation in the UV electromagnetic spectrum in the range of about 190 to about 400 nm or less than about 340 nm. Photocuring may also include applying to the electroactive photocurable composition UVC radiation in the range of about 220 to about 290 nm or about 254 nm.

Figure 2:
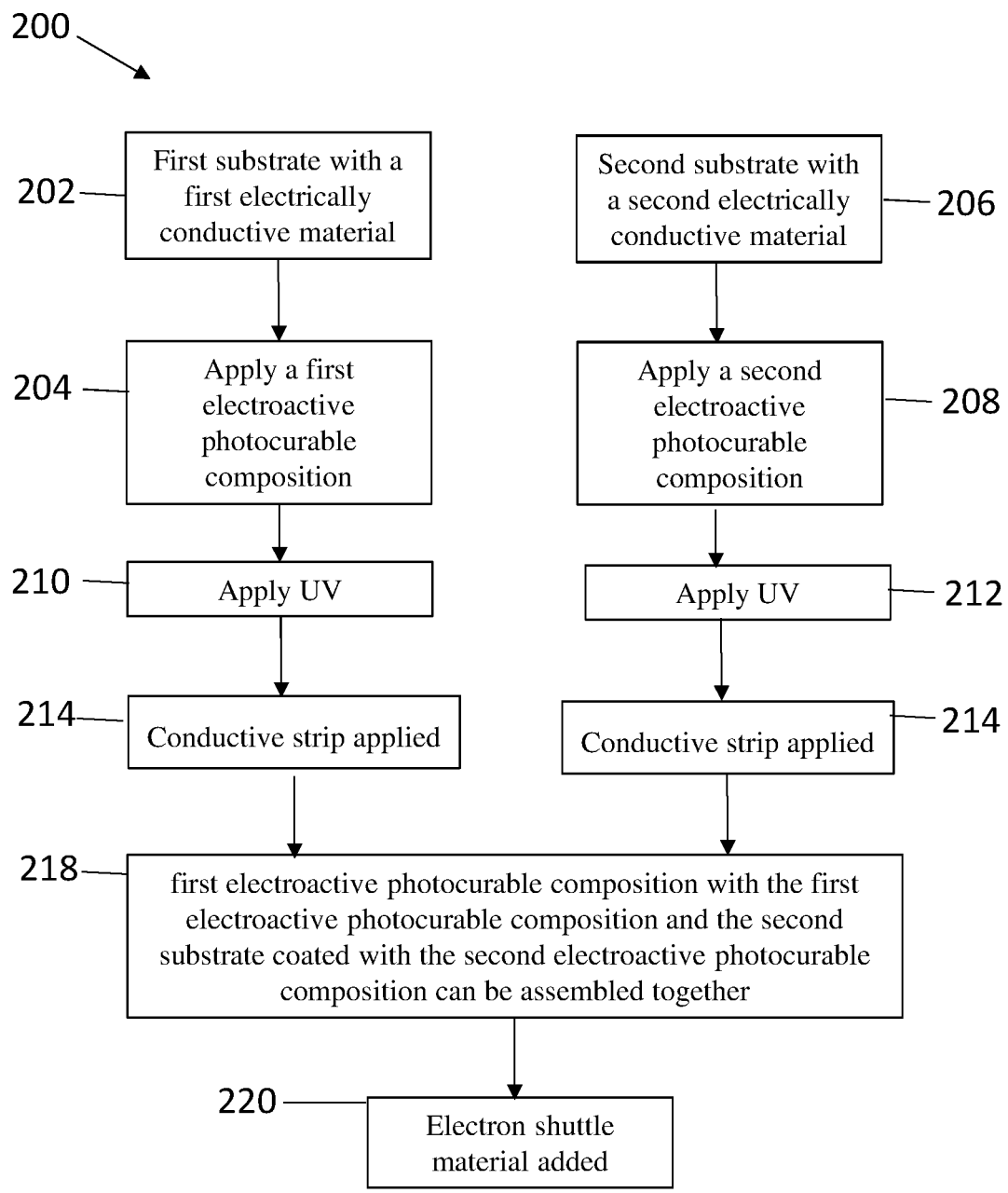
FIG. 2 is an exemplary workflow/flowchart of an aspect of the disclosed embodiments of the present disclosure.

Embodiment of the present disclosure can also include a method of assembling embodiments of an electrochromic device, such as, e.g., that which is illustrated in FIG. 1. The workflow 200 of the method illustrated in FIG. 2 can include providing a first substrate with a first electrically conductive material associated therewith 202 and applying by, for example, spraying, a first electroactive photocurable composition 204 including an ene compound, a thiol compound and an electroactive composition that may also be electrochromic thereto. The method can also include a second substrate with a second electrically conductive material associated therewith 206 and applying by, for example, spraying, a second electroactive photocurable composition 208 including an ene compound, a thiol compound and an electroactive composition that may also be electrochromic thereto. Radiation in the UV electromagnetic spectrum can then be applied to the above first and second substrates 210 and 212, respectively to produce a first cured electroactive photocurable composition on the first substrate and a second cured electroactive photocurable composition on the second substrate.

Each of the first substrate coated with the first electroactive photocurable composition and the second substrate coated with the second electroactive photocurable composition can have a conductive strip applied to the perimeter of the substrates 214 and 216, respectively. This conductive strip can act as a busbar for conducting electricity across the conductive surface 114 and 116 on each of the substrates. This strip can be comprised of different materials, such as, e.g., thermally cured silver epoxy or a metallic tape with a conductive adhesive.

Each of the first substrate coated with the first electroactive photocurable composition with the first electroactive photocurable composition and the second substrate coated with the second electroactive photocurable composition can be assembled together 218 in a spaced apart relationship with the photocurable composition inward facing (i.e. facing each other) and are held together by a perimeter seal. This seal can be comprised of a thermally cured epoxy material, by a photocured material, or the like. An inner seal can be used in conjunction with a secondary outer seal wherein each seal contributes particular performance characteristics to the assembly (such as, e.g., superior oxygen or moisture resistance). This construction results in the formation of an electrochromic cell with a defined space existing between the first substrate coated with the first electroactive photocurable composition and the second substrate coated with the second electroactive photocurable composition. This space is then filled with some type of matrix containing an ion transport layer 220. The interspaced matrix can be some type of gel or a solution. The matrix may consist of a crosslinked gel formed in situ.

This written description uses examples as part of the disclosure, including the best mode, and also to enable any person skilled in the art to practice the disclosed implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An electroactive photocurable polymer composition, comprising:
   an ene compound;
   a thiol compound; and
   an electroactive composition,
   wherein the electroactive photocurable polymer composition is capable of curing using UVC in the range of about 220 nm to about 290 nm.

2. The electroactive photocurable polymer composition of claim 1, wherein the electroactive composition includes an anodic material or a cathodic material.

3. The electroactive photocurable polymer composition of claim 1, wherein the electroactive composition is electrochromic.

4. The electroactive photocurable polymer composition of claim 1, wherein the ene compound includes a multi-functional ene compound including two or more polymerizable carbon-carbon double bonds.

5. The electroactive photocurable polymer composition of claim 1, wherein the thiol compound includes a multi-functional thiol compound including two or more thiol moieties.

6. The electroactive photocurable polymer composition of claim 1, wherein the electroactive photocurable polymer composition is capable of curing using UVC of about 254 nm.

7. An electrochromic device, comprising:
   a first substrate including a first electrically conductive material associated therewith and a cured electroactive photocurable polymer composition applied to and in contact with the first conductive material, wherein the photocurable polymer composition comprises:
      an ene compound;
      a thiol compound; and
      an electroactive composition;
   a second substrate including a second electrically conductive material associated therewith and an electroactive polymer composition applied to and in contact with the second conductive material; and
   an ion transport layer positioned between the first and second electroactive photocurable polymer composition and the second electroactive polymer composition,
   wherein the electroactive composition of the cured first electroactive photocurable polymer composition is either an anodic material or a cathodic material and the electroactive composition of the second electroactive polymer composition is the other of the anodic material or the cathodic material, at least one of the first substrate and the second substrate is substantially transparent and at least one of the anodic material and cathodic material is electrochromic.

8. The electrochromic device of claim 7, wherein the ene compound includes a multi-functional ene compound including two or more polymerizable carbon-carbon double bonds.

9. The electrochromic device of claim 7, wherein the thiol compound includes a multi-functional thiol compound including two or more thiol moieties.

10. The electrochromic device of claim 7, wherein the first substrate and the second substrate are both substantially transparent.

11. The electrochromic device of claim 7, wherein the photocurable polymer composition is capable of curing using UVC in the range of about 220 nm to about 290 nm.

12. The electrochromic device of claim 7, wherein the photocurable polymer composition is capable of curing using UVC of about 254 nm.

13. A method of forming a cured electroactive photocurable composition, comprising:
   providing an electroactive photocurable composition including an ene compound and a thiol compound; and
   curing the electroactive photocurable composition using radiation in the UV electromagnetic spectrum to form a cured electroactive polymer composition including the electroactive composition disposed in a matrix that includes a thiol-ene polymer,
   wherein the curing step includes using UVC in the range of about 220 nm to about 290 nm.

14. The method of claim 13, wherein the curing step include using UVC of about 254 nm.

15. The method of claim 13, wherein the electroactive photocurable composition includes an anodic material or a cathodic material.

16. The method of claim 13, wherein the electroactive photocurable composition includes an electrochromic material.

17. The method of claim 13, wherein the ene compound includes a multi-functional ene compound including two or more polymerizable carbon-carbon double bonds.

18. The method of claim 13, wherein the thiol compound includes a multi-functional thiol compound including two or more thiol moieties.

* * * * *